Nov. 14, 1933.          J. BOEKEL                1,935,499
STERILIZING OVEN
Filed Jan. 20, 1933
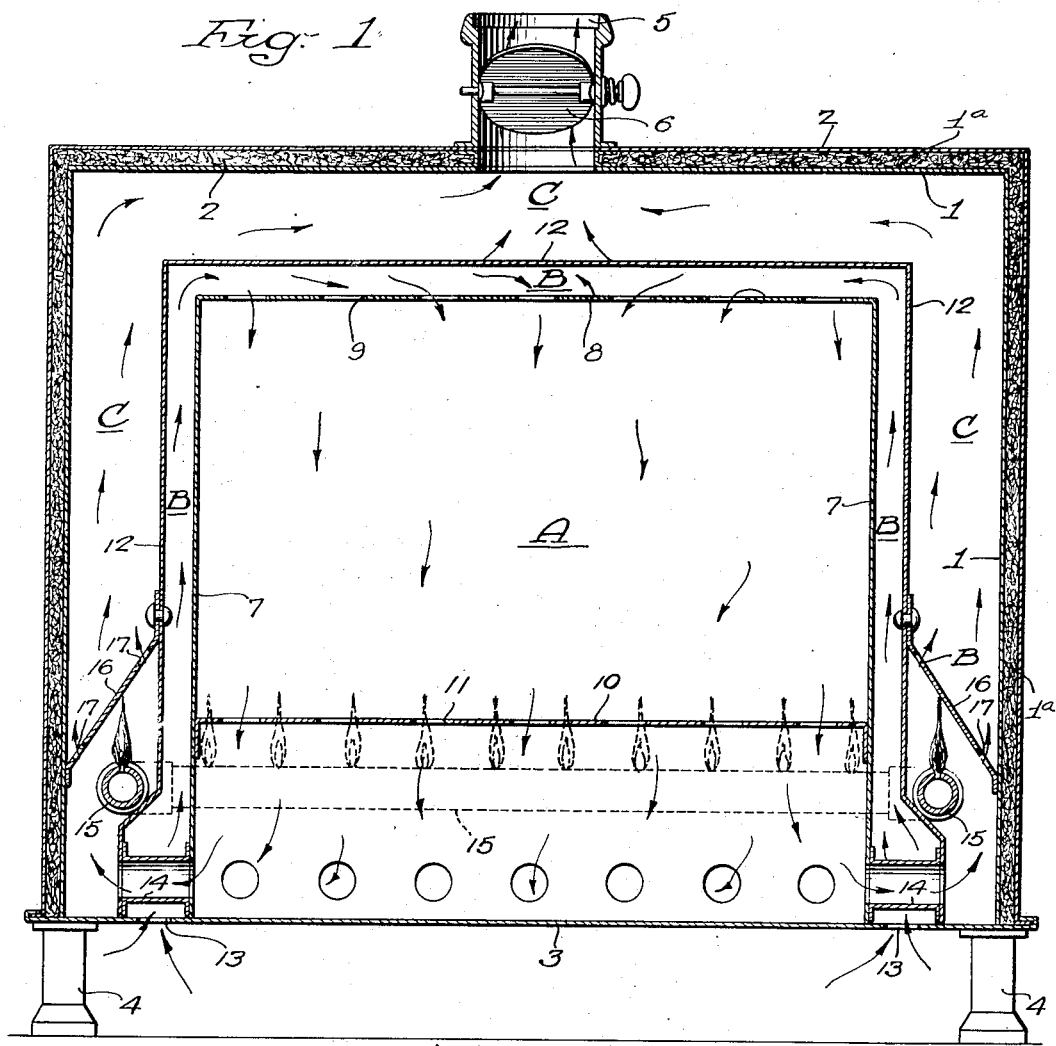
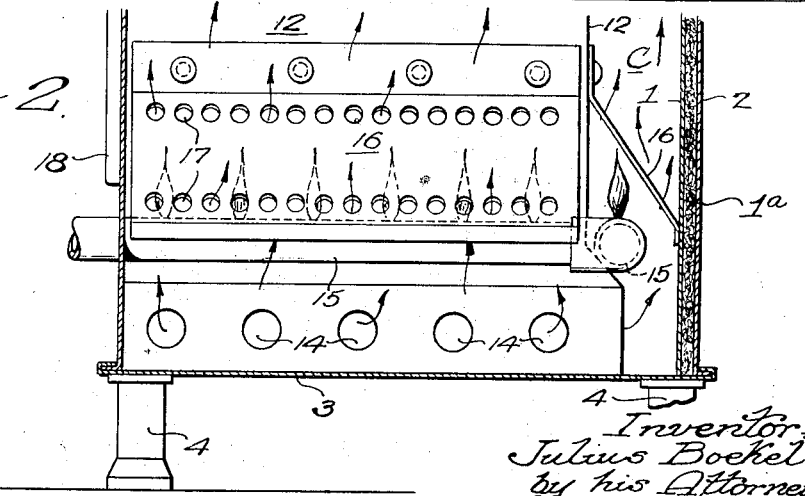

Patented Nov. 14, 1933

1,935,499

UNITED STATES PATENT OFFICE 1,935,499

STERILIZING OVEN

Julius Boekel, Philadelphia, Pa., assignor to Wm. Boekel & Company, Inc., Philadelphia, Pa., a corporation of Pennsylvania Application January 20, 1933. Serial No. 652,765

5 Claims. (Cl. 167—3)

This invention relates to new and useful improvements in sterilizing ovens and has particular relation to sterilizing ovens of the so-called circulating hot air type.

The principal object of the invention is to provide a device of the character described wherein the temperature of the sterilizing chamber may be maintained substantially uniform.

A more specific object of the invention is to provide an oven of the general character described having a novel baffle structure directly overlying the source of heat whereby the heat is concentrated at a point adjacent the bottom of the outer and inner air channels and the sterilizing chamber, whereby the temperature of the chamber is maintained substantially uniform throughout.

Certain other features and details of the invention are set forth hereinafter and disclosed in the accompanying drawing, in which:

Figure 1 is a view in section vertically through the hot air sterilizing oven constituting the present invention; and Fig. 2 is a fragmentary view in section on line 2—2, Fig. 1.

Heretofore, in hot air sterilizing ovens of the general character set forth and disclosed, it has been quite difficult to maintain a substantially uniform temperature at all points within the sterilizing chamber, and often times a difference in the temperature of the hot air at the top of said sterilizing chamber and the bottom thereof, will be as great as from 20° to 30° C., which is very undesirable.

By the present invention, a hot air sterilizing oven is provided wherein the temperature of the hot air circulating through the sterilizing chamber is maintained substantially uniform throughout said chamber with a maximum temperature difference of approximately only 3° to 4° C., which enables the material being sterilized to be subjected to a uniform heat treatment.

Referring now more particularly to the drawing, the hot air sterilizing oven constituting the present invention comprises a casing 1 covered with a sheet or layer of asbestos or other suitable insulating material 1a, which is held in position by means of a thin sheet or binder 2.

A substantially solid bottom 3 is provided for the casing 1 and the entire oven is mounted or rests upon legs or other supporting means 4 on the under-side of said bottom. A flue 5 is provided in the top of the casing 1 and is equipped with the usual damper 6.

The oven is provided with inner partitions or walls 7 and a roof or top member 8 having apertures 9 therein to form a sterilizing chamber A within the casing 1 substantially as shown in Fig. 1 of the drawing, and a bottom 10 having apertures 11 therein is secured to the walls 7 adjacent the bottom thereof to complete the sterilizing chamber A. An intermediate partition or casing 12 is interposed between the walls of the sterilizing chamber 7 and the outer insulated casing 1 of the oven as shown in Fig. 1 of the drawing. It will be noticed by referring to Fig. 1 of the drawing that an inner air channel B is defined by the chamber walls 7 and the partition 12 and an outer air channel C is defined by said partition 12 and the oven casing 1.

A plurality of apertures 13, constituting air inlet ports to the inner channel B are formed in the bottom 3 of the oven. Communication from the sterilizing chamber A to the outer air channel C for a purpose set forth later, is afforded by a number of ducts or tubes 14 connected intermediate the chamber walls 7 and partitions 12.

A gas burner 15 of substantially elongated configuration, is disposed adjacent the bottom of the outer air channel C, and as shown in the drawing, this burner extends about the two ends and rear side of the sterilizing chamber and the air channel B surrounding the latter. A baffle 16 having a plurality of aligned apertures 17 therein, as best shown in Fig. 2 of the drawing, is rigidly secured in the air channel C to the outer surface partition members 12 and extends to the inner surface of the outer insulated casing 1 of the oven, the said baffle structure substantially overlying the flame ports of the elongated gas burner 15 and being inclined inwardly in the direction of the intermediate partition or wall structure 12 as shown in Fig. 1 of the drawing.

The particular baffle structure 16 acts to retard the upward rise of heat emanating from the burners 15 and to deflect and concentrate the same against the adjacent surface of the partition 12. The baffle 16 is also provided with apertures 17 to permit the air entering the channel C from the chamber A through the ports 14, to pass through the baffle structure upwardly through said air channels C whence it is dissipated outwardly of the oven through the flue 5 controlled by the damper 6 as shown in Fig. 1 of the drawing.

The oven chamber is provided with the customary door or closure 18 to better maintain the high temperatures within the chamber, and also provision is made to facilitate determination of the temperature existing at any time therein.

In operation of the present invention, relatively cold air enters the ports 13 of the bottom 3 and enters the inner air channel B. The air passes the concentrated heat zone at the bottom of the channel effected by the novel baffle 16 and the air is warmed in a relatively short time to a substantially high temperature, the said air subsequently passing upwardly through the air channel B through the apertures 9 in the roof structure 8 of the chamber and downwardly through said sterilizing chamber A whence it enters the outer air channel C by means of the ducts or tubes 14 connected between the bottom of the said sterilizing chamber A and said outer air channel C.

The position of the baffle 16 functions to deflect the heat from the source 15 against the adjacent portion of the partition 12 to heat the latter to a high temperature and thus concentrate the heat at the bottom of the inner air channel B. The air entering the channel B is thus heated to a high temperature immediately on entering said channel, and concentration of heat in this manner also functions to raise the temperature at the bottom of the sterilizing chamber sufficiently to compensate or reheat the air which has a tendency to cool during passage downwardly within the chamber after entering the latter from the channel B. The temperature of the hot air circulating through the chamber A is thus maintained substantially uniform and the material being sterilized may be subjected to a uniform heat treatment.

While the particular embodiment of the invention has been set forth for the purpose of description, it is not intended that the invention be limited specifically thereto, but modifications and changes may be made in the detail structure and form of the present device without departing from the spirit of the invention.

What is claimed is:

1. In a sterilizing oven, the combination with means defining outer and inner air channels and a chamber surrounded thereby, of a source of heat positioned adjacent the bottom of said outer air channel, and a baffle disposed above said source to deflect the heat therefrom against the inner air channel and concentrating said heat at a point adjacent the entrance to the inner channel and the bottom of the chamber, whereby the temperature within said chamber is maintained uniform.

2. In a sterilizing oven, the combination with an inner casing defining a sterilizing chamber, an exterior casing surrounding said inner casing, an intermediate casing between the inner and outer casings defining, together with said inner and exterior casings and outer air channels respectively of a source of heat disposed adjacent the bottom of said outer air channel, and means disposed above said source to deflect the heat therefrom against the adjacent portion of the intermediate casing and concentrate said heat at a point adjacent the entrance to the inner air channel and the bottom of the chamber, whereby the temperature of the air circulating through said chamber is maintained uniform.

3. In a sterilizing oven, the combination with an inner casing defining a sterilizing chamber, an exterior casing surrounding said inner casing, an intermediate casing between the inner and outer casings defining, together with said inner and exterior casings inner and outer air channels respectively, of a source of heat disposed adjacent the bottom of said outer air channel, and a baffle rigidly disposed above said source to deflect the heat therefrom against the adjacent portion of the intermediate casing and concentrate said heat at a point adjacent the entrance to the inner air channel and the bottom of the chamber, whereby the temperature of the air circulating through said chamber is maintained uniform.

4. In a sterilizing oven, the combination with an inner casing defining a sterilizing chamber, an exterior casing surrounding said inner casing, an intermediate casing between the inner and outer casings defining, together with said inner casing an inner air channel, and with the exterior casing an outer air channel, said inner air channel having air inlet ports at the bottom thereof and communicating at the top with the sterilizing chamber, ducts connecting the bottom of said chamber and the outer air channel, of a burner disposed adjacent the bottom of said outer air channel, and inwardly inclined means above and in close proximity to said burner to deflect the heat therefrom against the adjacent portion of the intermediate casing and concentrate said heat at a point adjacent the entrance to the inner air channel and the bottom of the chamber whereby the temperature of the air circulating through said chamber is maintained uniform.

5. In a sterilizing oven, the combination with an inner casing defining a sterilizing chamber, an exterior casing surrounding said inner casing, an intermediate casing between the inner and outer casings defining, together with said inner casing an inner air channel, and with the exterior casing an outer air channel, said inner air channel having air inlet ports at the bottom thereof and communicating at the top with the sterilizing chamber, ducts connecting the bottom of said chamber and the outer air channel, of a burner disposed adjacent the bottom of said outer air channel, and an inwardly inclined baffle above and in close proximity to said burner to deflect the heat therefrom against the adjacent portion of the intermediate casing and concentrate said heat at a point adjacent the entrance to the inner air channel and the bottom of the chamber whereby the temperature of the air circulating through said chamber is maintained uniform.

JULIUS BOEKEL.